May 15, 1934. R. G. BLOXSOM 1,959,074
TUBE CLAMP
Filed Nov. 27, 1931
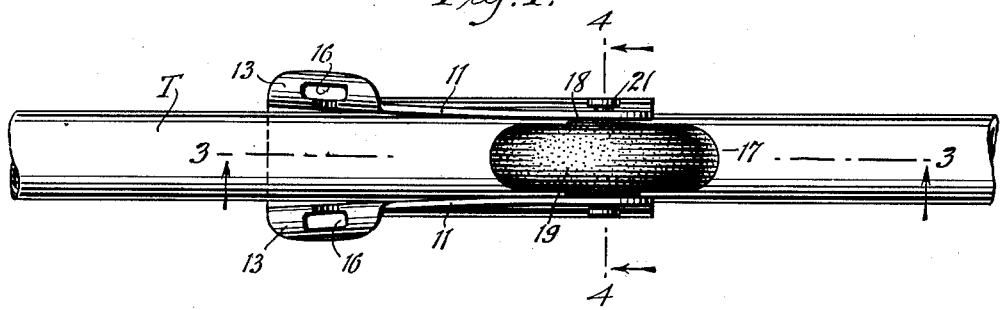
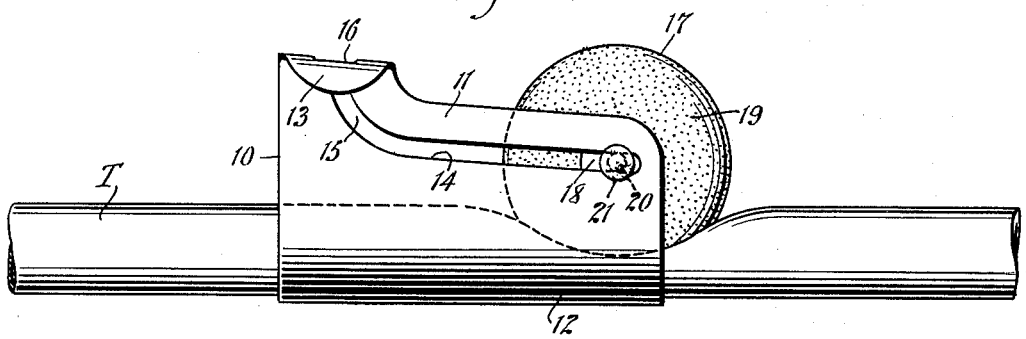
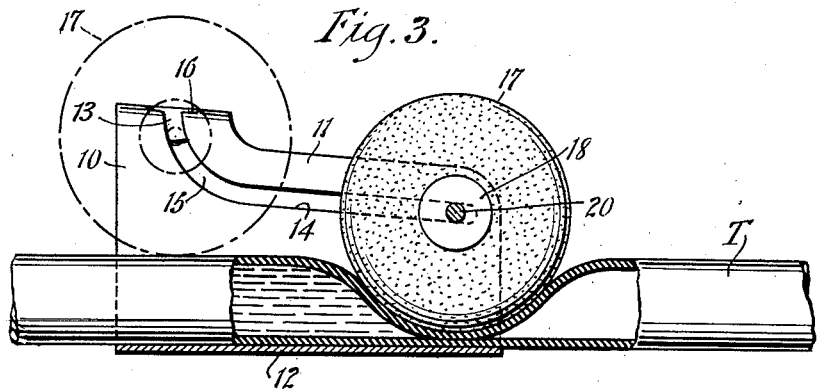
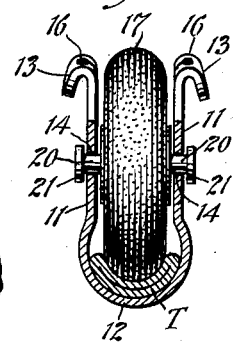
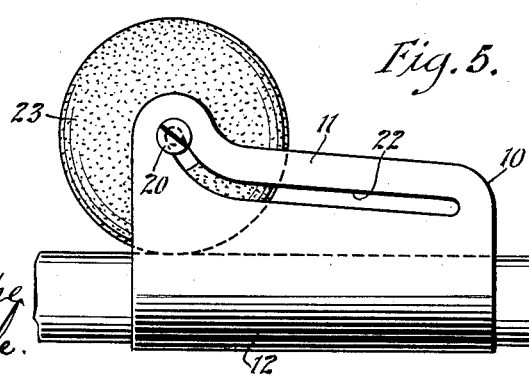
WITNESSES
Edw. Thorpe
Chris Feinle.
INVENTOR
Robert G. Bloxsom
BY
Munn & Co.
ATTORNEY Patented May 15, 1934

1,959,074

UNITED STATES PATENT OFFICE 1,959,074

TUBE CLAMP

Robert Gerry Bloxsom, Camden, N. J.

Application November 27, 1931, Serial No. 577,673

1 Claim. (Cl. 251—5)

This invention relates to a clamping device adapted to be used on a flexible tubing of divers apparatus and devices for the purpose of controlling the flow of fluid or liquid through such tubing.

The principal object of the invention is the provision of a clamp of the indicated character which will be simple, inexpensive and efficient, whereby the advantages hereinafter fully set forth may be had.

In the drawing—

Figure 1 is a plan view of the clamp applied to a portion of a flexible tube;

Figure 2 is a side view of the part shown in Figure 1;

Figure 3 is a longitudinal section on the line 3—3 of Figure 1;

Figure 4 is a transverse section on the line 4—4 of Figure 1;

Figure 5 is a side elevation of a modified form of clamp.

In the embodiment of the invention shown in Figures 1 to 4, inclusive, the clamp includes means to hold the clamp in place on the flexible tube T. The said means consists of a metal part 10 of U-shape in cross section and consisting of flexible sides 11 suitably joined by a cross sectionally rounded portion 12. The portion 12 conforms to the cross sectional shape of the tube and engages the same in such manner as to hold the device on the tube and yet allow the device to slide on the tube. Each of the sides 11 is outwardly and downwardly curved or curled as at 13. Each of the sides 11 has a guide slot 14 therein which curves as at 15 and terminates in an enlargement 16 in the curl 13. The straight portion of the slot 14 is disposed at an angle with respect to the rounded portion 12. The clamp also includes means detchably associated with the means hereinabove described which is movable in relation thereto to collapse the tube wholly or partly, to control the flow of fluid therethrough. This second means consists of a roller 17 consisting of a hub 18 and a resilient section 19 of rubber or the like arranged on the hub 18. The hub has arbors, stub shafts or trunnions 20, each of which has a head 21. The roller 17 is associated with the part 10 by entering the heads 21 of the trunnions 20 in the enlargements 16 of the slots by pressing or flexing the sides 11 toward each other until the enlargements 16 will be spaced to receive the heads 21. In this manner the trunnions 20 will be received in the slots 14 to guide the movement of the roller 17 along the tube and also to allow it to rotate. The periphery of the resilient section 19 of the roller is rounded cross sectionally. By reason of the angularity of the straight portion of the slots 14, the roller will cause a gradual collapsing of the tube by rolling in contact therewith. The collapse of the tube may be wholly, that is to say, one side wall will be pressed against the other side wall in which the roller co-operates with the rounded portion 12 of the part 10, or the tube may be only partly collapsed to regulate, control or stop the flow of fluid or liquid through the tube. The roller may be moved to open position shown in dot and dash lines in Figure 3, to allow full flow of fluid or liquid through the tube. When the roller is in open position, the heads 21 will not be in absolute registration with the enlargements 16, thus preventing unintentional separation of the roller from the part 10.

In order to reduce costs slots 22 omitting the enlargements 16 may be provided in the sides 11 of the part 10, and the said sides being constructed without the curls 13. In this case an arbor 20 will be extended through the slots 22 and the roller, after which the heads 21 are formed on the arbor. And use may be made of an inflexible roller 23, as shown in Figure 5. In other respects, this form of clamp is similar to that shown in Figures 1 to 4, inclusive, and the corresponding parts have similar reference numerals.

From the foregoing it will be apparent that both parts of the clamp are shaped to preserve the normal contour of the tubing, whether partly or entirely collapsed, one side wall of the tubing being reversed when pressed toward the other side wall until a tight joint is made, with equal pressure on all parts of the tubing, thereby diminishing damage to the tubing which would be caused by excessive pressure on the folds; that the clamp eliminates edges and uneven surfaces in contact with the tubing thereby preventing injury thereto; that by reason of the headed arbors and particular form of slots 14, the roller 17 may be conveniently attached to the part 10 and be detached therefrom, thereby enabling the application of the device to a tube and its removal therefrom without disconnecting the apparatus to which the ends of the tubing are attached; that there is a direct contact of the roller section 18 with the tubing and, by reason of its resilient character, it will be able to expand at the sides when under pressure, thereby filling the side space when less resistance is offered by the tubing itself and the fluid pressure within the latter; and that the guide slots 14 are longer than necessary to make a tight joint to compensate for wear and variations in the thickness in the wall of the tubing caused by repeated use of the clamp on the tubing at a certain point in the length thereof.

I claim:

A flexible tube clamping device comprising a part having flexible sides suitably united by a rounded portion which conforms to one side of the tube, said part serving to hold the device on the tube, a roller having axially alined headed trunnions, said sides having slots therein each terminating at one of its ends in an enlargement, said trunnions being received respectively in said slots so that said roller may rotate and follow a path in relation to said rounded portion to collapse said tube to control the flow of fluid therethrough, said roller being attachable with said part and also detachable therefrom by pressing the heads of the trunnions through the enlargements of the slots when the sides are flexed from their normal positions.

ROBERT GERRY BLOXSOM.